(12) United States Patent
Corlett

(10) Patent No.: US 9,026,691 B2
(45) Date of Patent: May 5, 2015

(54) SEMI-AUTONOMOUS TOUCH I/O DEVICE CONTROLLER OPERATION UNDER CONTROL OF HOST

(71) Applicant: Apple Inc., Cupertino, CA (US)

(72) Inventor: Barry J. Corlett, Brisbane, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/927,812

(22) Filed: Jun. 26, 2013

(65) Prior Publication Data

US 2013/0346641 A1    Dec. 26, 2013

Related U.S. Application Data

(60) Provisional application No. 61/664,291, filed on Jun. 26, 2012, provisional application No. 61/784,651, filed on Mar. 14, 2013.

(51) Int. Cl.
*G06F 3/00* (2006.01)
*G06F 13/10* (2006.01)

(52) U.S. Cl.
CPC .................................. *G06F 13/10* (2013.01)

(58) Field of Classification Search
None
See application file for complete search history.

(56) References Cited

U.S. PATENT DOCUMENTS

| 5,748,185 | A  | * | 5/1998  | Stephan et al. ............... 345/173 |
| 5,940,526 | A  |   | 8/1999  | Setlak et al. |
| 6,323,846 | B1 |   | 11/2001 | Westerman et al. |
| 6,570,557 | B1 |   | 5/2003  | Westerman et al. |
| 6,677,932 | B1 |   | 1/2004  | Westerman |
| 6,888,536 | B2 |   | 5/2005  | Westerman et al. |
| 7,657,849 | B2 | * | 2/2010  | Chaudhri et al. ............. 715/863 |
| 2010/0159995 | A1 | * | 6/2010  | Stallings et al. .............. 455/566 |
| 2010/0306718 | A1 | * | 12/2010 | Shim et al. ..................... 715/863 |
| 2011/0050602 | A1 |   | 3/2011  | Jeong et al. |
| 2011/0248929 | A1 |   | 10/2011 | Tong et al. |
| 2011/0294467 | A1 |   | 12/2011 | Kim et al. |
| 2012/0129496 | A1 | * | 5/2012  | Park et al. ...................... 455/411 |
| 2013/0086522 | A1 | * | 4/2013  | Shimazu et al. .............. 715/810 |
| 2013/0169573 | A1 | * | 7/2013  | Nishio .......................... 345/173 |
| 2013/0300687 | A1 | * | 11/2013 | Park .............................. 345/173 |

\* cited by examiner

*Primary Examiner* — Idriss N Alrobaye
*Assistant Examiner* — David Martinez
(74) *Attorney, Agent, or Firm* — Brownstein Hyatt Farber Schreck, LLP

(57) ABSTRACT

A touch I/O device controller may operate in an idle state, a wait for finger on state, and a finger on state. The finger on state may include a hold sub-state, a capture sub-state, a navigation sub-state, and a pre-capture sub-state. The controller may switch states and/or sub-states based on commands received from its host or based on a sub-state variable set by the host. When the controller detects a finger of a user and enters the finger on state, the touch I/O device may enter a particular sub-state based on the sub-state variable. Further, when a fingerprint is captured in capture sub-state, the controller may switch sub-states based on the value of the sub-state variable. In various implementations, the host may provide one or more APIs that may be utilized by applications to directly influence the controller and/or request that the host do so.

20 Claims, 5 Drawing Sheets

SEMI-AUTONOMOUS TOUCH I/O DEVICE CONTROLLER OPERATION UNDER CONTROL OF HOST

CROSS-REFERENCE TO RELATED APPLICATIONS

The present application claims the benefit under 35 U.S.C. §119(e) to U.S. Provisional Patent Application No. 61/664,291, which was filed on Jun. 26, 2012, and entitled "Semi-Autonomous Touch I/O Device Controller Operation Under Control of Host," and U.S. Provisional Patent Application No. 61/784,651, which was filed on Mar. 14, 2013, and entitled "Semi-Autonomous Touch I/O Device Controller Operation Under Control of Host," both of which are incorporated by reference as if fully disclosed herein.

FIELD OF THE INVENTION

This disclosure relates generally to touch I/O device controllers, and more specifically to semi-autonomous operation of touch I/O device controllers under the control of a host device.

BACKGROUND

Touch I/O devices, such as touch sensitive panels, may receive touch input for interacting with a computer system. Such touch I/O devices may operate under the direction of a touch I/O device controller that is controlled by the computer system (i.e., the host). For example, a touch I/O device may detect one or more fingers of a user in order to capture one or more fingerprints, monitor movement of the user's finger(s) in order to determine one or more navigational directions, and so on. Whether the touch I/O device captures the user's fingerprint or monitors movement of the user's finger in order to determine navigational direction may depend on the sub-state in which the touch I/O device controller is operating. In some cases, the host may control the sub-state in which the touch I/O device controller is operating. Such control may be influenced based on a determination of what function the user is attempting to use the touch I/O device for.

However, in order to control the operational sub-state of the touch I/O device, the host may need to frequently communicate with the touch I/O device controller to obtain data regarding the user's finger, make determinations regarding such data, and communicate with the touch I/O device controller to accordingly control the operational sub-state of the touch I/O device. Such operations may be burdensome on the host and may consume finite host processing resources, power resources (as the host may consume more power than the touch I/O device controller and/or the host may have to operate more frequently and thus consume more power when communicating so frequently with the touch I/O device controller), and/or finite communication bandwidth between the host and the touch I/O device controller.

In addition to consuming finite host processing resources, power resources, and/or communication bandwidth resources, such host monitoring and communication may not be performable without delays that are noticeable to a user. For example, a user may attempt to utilize a touch I/O device for navigation purposes when the touch I/O device controller is operating in a fingerprint capture sub-state. In such a case, the host may have to receive data regarding the user's utilization of the touch I/O device, determine that the user is attempting to user the touch I/O device for navigation rather than fingerprint capture, and switch the sub-state of the touch I/O device controller to navigation sub-state. However, the user may notice that the requested navigation is not occurring by the time that the host is able to switch the sub-state if the delay is of a sufficient duration. Further, in some cases at least a portion of the user's intended navigation input received before the host is able to switch the sub-state may be lost. In either situation, the host may not respond as the user expects. This may cause the user to become frustrated and/or otherwise dissatisfied with the host.

SUMMARY

The present disclosure discloses systems and methods for semi-autonomous operation of touch I/O device controllers under the control of a host device. A touch I/O device controller may operate in at least one of an idle state, a wait for finger on state, and a finger on state. The finger on state may include a hold sub-state where the touch I/O device is inactive, a capture sub-state where a user's fingerprint is captured, a navigation sub-state where a user's finger movements are processed as navigation input, and a pre-capture sub-state where the touch I/O device controller determines whether touch input is to be processed as a fingerprint capture or as navigation data. The touch I/O device controller may switch states and/or sub-states based on one or more commands received from the host of the touch I/O device or, in the absence of host commands, based on a sub-state variable set by the host. As such, in the absence of commands from the host, the touch I/O device may operate semi-autonomously based on the sub-state variable set by the host.

When the touch I/O device controller detects a finger of a user on the touch I/O device and enters the finger on state, the touch I/O device may enter the capture sub-state, the navigation sub-state, or the pre-capture sub-state based on the value of the sub-state variable. Further, when a fingerprint is captured in the capture sub-state, the touch I/O device controller may switch to the pre-capture sub-state, remain in the capture sub-state, or switch to the navigation sub-state based on the value of the sub-state variable. Additionally, the touch I/O device controller may switch to a particular sub-state or state whether currently operating in the wait for finger state, the idle state, or any of the sub-states of the finger on state in response to a direct command from the host.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

In various implementations, the host may provide one or more applications access to one or more APIs that may be utilized to directly set or change the value of the sub-state variable, send one or more commands to the touch I/O device controller, receive one or more interrupts generated by the touch I/O device controller, and/or request that the host perform such operations.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
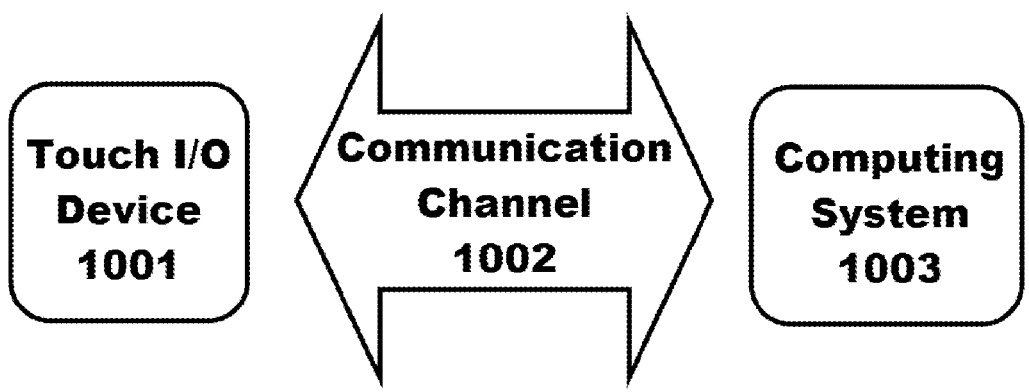
FIG. 1 is a block diagram illustrating a touch I/O device that can receive touch input for interacting with a computer system.

The description that follows includes sample systems, methods, and computer program products that embody various elements of the present disclosure. Embodiments described herein may be configured to operate with a variety of sensors, including strip or swipe sensors, array or other two-dimensional sensors, and the like. However, it should be understood that the described disclosure may be practiced in a variety of forms in addition to those described herein.

The present disclosure discloses systems and methods for semi-autonomous operation of touch I/O device controllers under the control of a host device. A touch I/O device controller may operate in at least one of an idle state, a wait state, and a finger on state. The finger on state may include a number of operational sub-states such as a pre-capture sub-state, a capture sub-state, a navigate sub-state, and a hold sub-state. The touch I/O device controller may switch states and/or sub-states based on one or more commands received from the host of the touch I/O device. In the absence of commands from the host when operating in the finger on state, the touch I/O device may operate semi-autonomously based on one or more sub-state settings set by the host. In this way the touch I/O device controller may be able to operate semi-autonomously such that constant monitoring and control by the host is not required, reducing delay and consumption of host processing, power, and communication bandwidth resources, but the host may still remain in control of the touch I/O device controller.

Described embodiments may include touch I/O device 1001 that can receive touch input for interacting with the computing system 1003 (FIG. 1) via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch-sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input. The touch I/O device 1001 may sense a touch through changes in capacitance, resistance, pressure, interruption of electromagnetic waves, reflection of electromagnetic or ultrasonic energy, and the like.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include, but are not limited to, a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or sub-state of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

In various implementations, one or more fingerprint sensors may be incorporated into the touch I/O device 1001, located underneath the touch I/O device 1001, incorporated into one or more other touch I/O devices (which may be different types of touch I/O device than the touch I/O device 1001), and so on.

Figure 2:
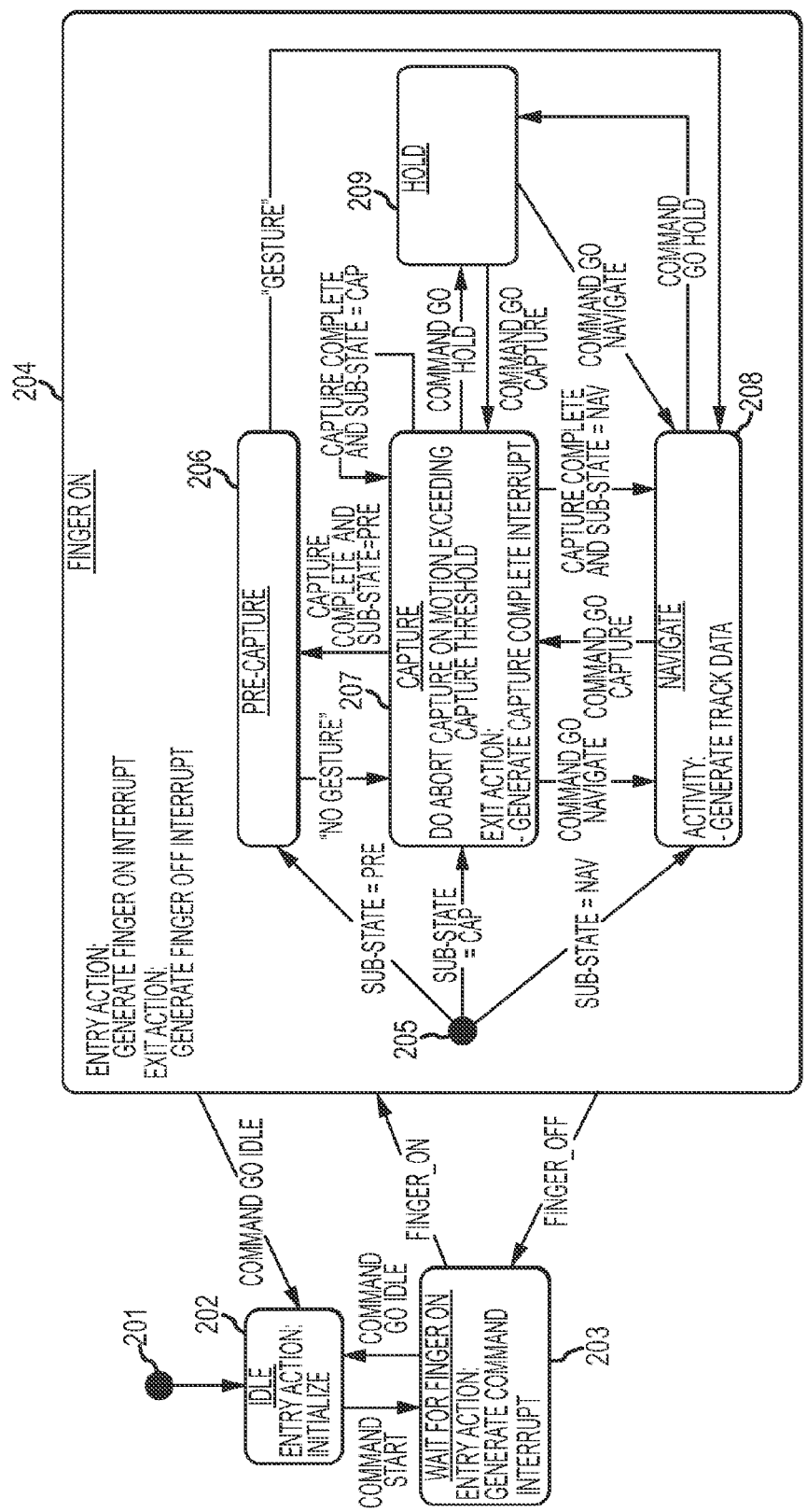
FIG. 2 is a state diagram illustrating semi-autonomous operation of touch I/O device controllers under the control of a host device.

FIG. 2 is a state diagram illustrating semi-autonomous operation of a touch I/O device controller (such as a touch I/O device controller for the touch I/O device 1001 of FIG. 1) under the control of a host device (such as the computing system 1003 of FIG. 1). As illustrated, the touch I/O device controller may be operable in an idle state 202, a wait for finger on state 203, and a finger on state 204. The touch I/O device controller may operate in the idle state when initializing for use or at any other time when the touch I/O device controller is not prepared to monitor for touch input. Similarly, the touch I/O device controller may operate in the wait for finger state when a user is not touching the touch I/O device and may operate in the finger on state when a user is touching the touch I/O device.

Whenever the touch I/O device controller switches between states, the touch I/O device controller may generate an appropriate command interrupt (such as a wait for finger on command interrupt, a finger on interrupt, a finger off interrupt, and so on). Generating a command interrupt may include notifying the host of the action being performed by the touch I/O device controller (such the state change being performed). In some cases, the command interrupt may involve communicating with the host to exchange information (such as information regarding the state change being performed, the detection of a user's finger on the touch I/O device, the detection of no user's finger on the touch I/O device, and so on). In other cases, the command interrupt may involve a notification transmitted to the host.

When the touch I/O device controller first begins operation 201, the touch I/O device controller may switch to the idle state 202 and perform one or more operations related to initializing the touch I/O device and/or the touch I/O device controller itself. The touch I/O device controller may remain in the idle state until a command is received from the host to start (though in various implementations the touch I/O device controller may enter the wait for finger on state 203 from the idle state when initialization operations are complete instead of waiting for a start command). When the start command is received from the host, the touch I/O device controller enters the wait for finger on state.

In the wait for finger on state 203, the touch I/O device controller may monitor the touch I/O device to determine whether or not a user is touching the touch I/O device. If the touch I/O device controller determines that a user is not touching the touch I/O device, the touch I/O device controller may continue to operate in the wait for finger state. If the touch I/O device controller determines that a user is touching the touch I/O device, the touch I/O device controller may switch to the finger on state 204 and generate a command interrupt related to the entry into the finger state. Upon entry into the wait for finger state, the touch I/O device controller may generate a command interrupt related to the entry into the wait for finger state.

While operating in the wait for finger on state 203, the touch I/O device controller may receive one or more commands from the host to switch to the idle state 202. If the touch I/O device controller receives such a command the touch I/O device controller may immediately switch to the idle state.

The finger on state 204 may include a number of operating sub-states. Such sub-states may include a pre-capture sub-state 206, a capture sub-state 207, a navigate sub-state 208, and a hold sub-state 209. When the touch I/O device controller switches 205 to the finger on state 206, the touch I/O device controller may determine whether to operate in the pre-capture sub-state, the capture sub-state, or the navigation sub-state based on a value assigned to a sub-state variable. The sub-state variable may be a global variable. The sub-state variable may be set by the host and may be stored by a storage medium of the touch I/O device controller that is accessible by the host, a storage medium of the host that is accessible by the touch I/O device controller, and so on.

If the sub-state variable is set to pre-capture when the touch I/O device controller enters the finger on state 204, the touch I/O device controller may determine to operate the device in the pre-capture sub-state 206 and enter that state accordingly. If the sub-state variable is set to capture when the touch I/O device controller enters the finger on state, the touch I/O device controller may determine to operate the device in the capture sub-state 207 and enter that state accordingly. If the sub-state variable is set to navigate 208 when the touch I/O device controller enters the finger on state, the touch I/O device controller may determine to operate the device in the navigate sub-state and enter that state accordingly. Upon entry into the finger on state, the touch I/O device controller may generate a command interrupt related to the entry into the finger state.

At any time while the touch I/O device controller is operating in the finger on state 204 the touch I/O device controller determines that a user is no longer touching the I/O device, the touch I/O device controller may switch to the wait for finger on state 203 and generate a command interrupt related to the entry into the wait for finger state.

The pre-capture sub-state 206, the capture sub-state 207, the navigation sub-state 208, and the hold sub-state 209 will now be described. In the capture sub-state, the touch I/O device controller may utilize the touch I/O device to attempt to capture one or more fingerprints of the user. Upon capture of a fingerprint, the touch I/O device controller may exit the capture sub-state, generate a command interrupt related to completion of capture of a fingerprint, and evaluate the sub-state variable. If the sub-state variable is set to pre-capture the touch I/O device controller may switch to the pre-capture sub-state. If the sub-state variable is set to capture the touch I/O device controller may continue operating in the capture sub-state. If the sub-state variable is set to navigate the touch I/O device controller may switch to the capture sub-state.

While operating in the capture sub-state 207, the touch I/O device controller may determine that the user's finger has moved more than a threshold amount during capture. As such, the touch I/O device controller may determine that the current capture cannot continue and may abort the current capture. In some cases, the touch I/O device controller may abort the current capture and retry capturing the user's fingerprint. In other cases, the touch I/O device controller may exit the capture sub-state, generate a capture failed interrupt, and determine whether to switch to the pre-capture sub-state 206, switch to the navigation sub-state 208, or remain in the capture sub-state based on the value of the sub-state variable.

For example, the touch I/O device controller may capture a user's fingerprint in sequential portions. After capturing a number of portions of the user's fingerprint, the touch I/O device controller may compare a previously captured portion with the current state of that portion. If the comparison indicates that the user's finger has moved more than a threshold amount (such as more than two hundred microns), the touch I/O device controller may determine to abort the current capture attempt.

While operating in the capture sub-state 207, the touch I/O device controller may receive one or more commands from the host to switch to the navigation sub-state 208. If the touch I/O device controller receives such a command the touch I/O device controller may immediately switch to the navigation sub-state. In some cases the touch I/O device controller may discard any data relating to a user fingerprint currently being captured when switching to the navigation sub-state in response to a host command.

Additionally, while operating in the capture sub-state 207, the touch I/O device controller may receive one or more commands from the host to switch to the hold sub-state 209. If the touch I/O device controller receives such a command the touch I/O device controller may immediately switch to the hold sub-state. In some cases the touch I/O device controller may discard any data relating to a user fingerprint currently being captured when switching to the hold sub-state in response to a host command.

In the pre-capture sub-state 206, the touch I/O device controller may obtain data from the touch I/O device and determine whether to use that data for capturing a user's fingerprint or navigation. In making such a determination, the touch I/O device controller may determine whether the data indicates that the user's fingerprint is moving more than a threshold amount (such as more than six hundred microns). If so, the touch I/O device controller may switch to the navigation sub-state 208 (and may generate a command interrupt accordingly) and use the data for navigation. Otherwise, the touch I/O device controller may switch to the capture sub-state 207 (and may generate a command interrupt accordingly).

In the navigation sub-state 208, the touch I/O device controller may obtain data from the touch I/O device regarding movement of the user's finger for navigation purposes. Such movement of the user's finger may be processed to identify and track one or more gestures (such as by converting the movement of the user's finger into one or more vectors and processing the one or more vectors to determine one or more gestures). A gesture may correspond to stationary or non-stationary, single or multiple, touches or near touches on the touch I/O device. A gesture may be performed by moving one or more fingers in a particular manner on the touch I/O device such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers.

While operating in the navigation sub-state, the touch I/O device controller may receive one or more commands from the host to switch to the capture sub-state 207. If the touch I/O device controller receives such a command the touch I/O device controller may immediately switch to the capture sub-state. Additionally, while operating in the navigation sub-state, the touch I/O device controller may receive one or more commands from the host to switch to the hold sub-state 209. If the touch I/O device controller receives such a command the touch I/O device controller may immediately switch to the hold sub-state.

In the hold sub-state 209, the touch I/O device controller does not capture any user fingerprints or utilize user fingerprints to generate navigation data. Rather, in the hold sub-state the touch I/O device may wait for one or more commands to enter a different sub-state. In some cases the touch I/O device controller may provide reduced power to the touch I/O device in the hold sub-state. While operating in the hold sub-state, the touch I/O device controller may receive one or more commands from the host to switch to the capture sub-state 207. If the touch I/O device controller receives such a command the touch I/O device controller may immediately switch to the capture sub-state. Additionally, while operating in the hold sub-state, the touch I/O device controller may receive one or more commands from the host to switch to the navigation sub-state 208. If the touch I/O device controller receives such a command the touch I/O device controller may immediately switch to the navigation sub-state.

The host may command the touch I/O device controller to enter the hold sub-state 209 when the touch I/O device will not be used, such as when the touch I/O device controller has been inactive for a period of time (in one implementation, three seconds), when no application being executed by the host utilizes the touch I/O device, and so on. In such situations, the host may command the touch I/O device controller to enter the hold sub-state in order to conserve power, reduce the possibility of accidental input, and so on.

In some implementations, the touch I/O device controller may monitor the touch I/O device for movement of the user's finger. Such monitoring may be continuous or may be performed on a periodic basis. In such implementations, the touch I/O device controller may determine to switch sub-states from the hold sub-state 209 (such as to the pre-capture sub-state 206, the capture sub-state 207, and/or the navigation sub-state 208) if such movement is detected. This determination of which sub-state to switch to may be based upon the value of the sub-state variable.

At any time during the pre-capture sub-state 206, the capture sub-state 207, the navigation sub-state 208, or the hold sub-state 209, the touch I/O device controller may determine that the user is no longer touching the touch I/O device. If so, the touch I/O device controller may switch to the wait for finger on state 203 and may generate a command interrupt accordingly. Additionally, at any time during the pre-capture sub-state 206, the capture sub-state 207, the navigation sub-state 208, or the hold sub-state 209, the touch I/O device controller may receive one or more commands from the host to switch to the idle state 202. If so, the touch I/O device controller may switch to the idle state and may generate a command interrupt accordingly.

The value of the sub-state variable may be maintained when the touch I/O device controller switches from the finger on state 204 to the idle state 202 or the wait for finger on state 203. In other words, when the touch I/O device controller switches from the idle state or the wait for finger state to the finger on state, the value of the sub-state variable may be the same as the last time the touch I/O device controller was in the finger on state as long as the host has not changed the value of the sub-state variable in the interim.

As a result of the above, the touch I/O device controller may be able to operate semi-autonomously of the host yet still remain under control of the host. Thus, the host may not be required to constantly monitor the touch I/O device. This may reduce delay and/or consumption of host processing, power, and communication bandwidth resources while still allowing the host may to retain control of the touch I/O device controller.

Although the state diagram of FIG. 2 is illustrated and described above with respect to touch by a user's finger, it is understood that other implementations are possible and contemplated. For example, in some implementations the touch I/O device may be utilized with a stylus that has a capacitive tip. In such implementations, the touch I/O device controller may operate in at least one of an idle state, a wait state, and a stylus on state. The finger on state may include a number of operational sub-states such as a selection sub-state (where the touch of the style is utilized to select one or more elements of a corresponding user interface), a navigate sub-state, and a hold sub-state. The touch I/O device controller may switch states and/or sub-states based on one or more commands received from the host of the touch I/O device. In the absence of commands from the host when operating in the stylus on state, the touch I/O device may operate semi-autonomously based on one or more sub-state settings set by the host.

It is understood that although the above illustrates and describes particular state operations performed in particular orders, other configurations of other state operations are possible without departing from the scope of the present disclosure. For example, in some implementations the pre-capture sub-state 206 and the capture sub-state 207 may be combined into a single sub-state.

Figure 3:
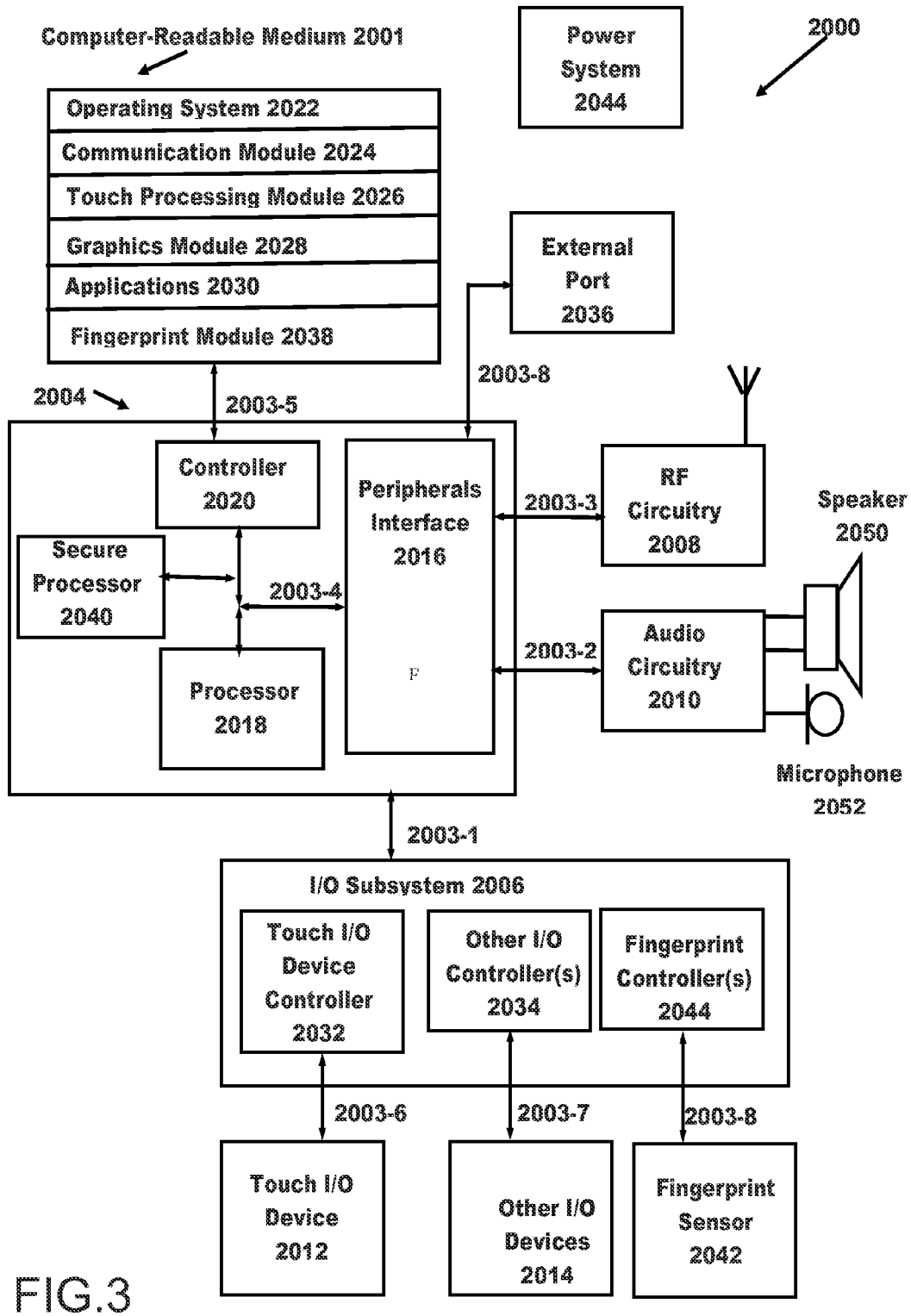
FIG. 3 is a block diagram illustrating computer system that includes a touch I/O device that can receive touch input for interacting with the computer system.

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 3 is a block diagram of one embodiment of system 2000 that generally includes one or more computer-readable mediums 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in FIG. 3 is only one example architecture of system 2000, and that system 2000 could have more or fewer components than shown, or a different configuration of components. The various components shown in FIG. 3 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with FIG. 2. Fingerprint sensing module 2038 may at least function to perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. The operation of these various elements will now be described.

The fingerprint sensor 2042 may operate to capacitively capture a series of images, or nodes. When taken together, these nodes may form a fingerprint. The full set of nodes may be referred to herein as a "mesh."

Each node in the mesh may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. Generally, the fingerprint data is encrypted by any of the fingerprint sensor 2042, the fingerprint I/O controller 2044 or another element prior to being transmitted to either processor. The secure processor 2040 may decrypt the data to reconstruct the node.

Fingerprint data, either as nodes or meshes, may be stored in the computer-readable medium 2001 and accessed as necessary. In some embodiments, only the secure processor 2040 may access stored fingerprint data, while in other embodiments either the secure processor or the processor 2018 may access such data.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (such as the Operating System 2022 of FIG. 3) (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 4:
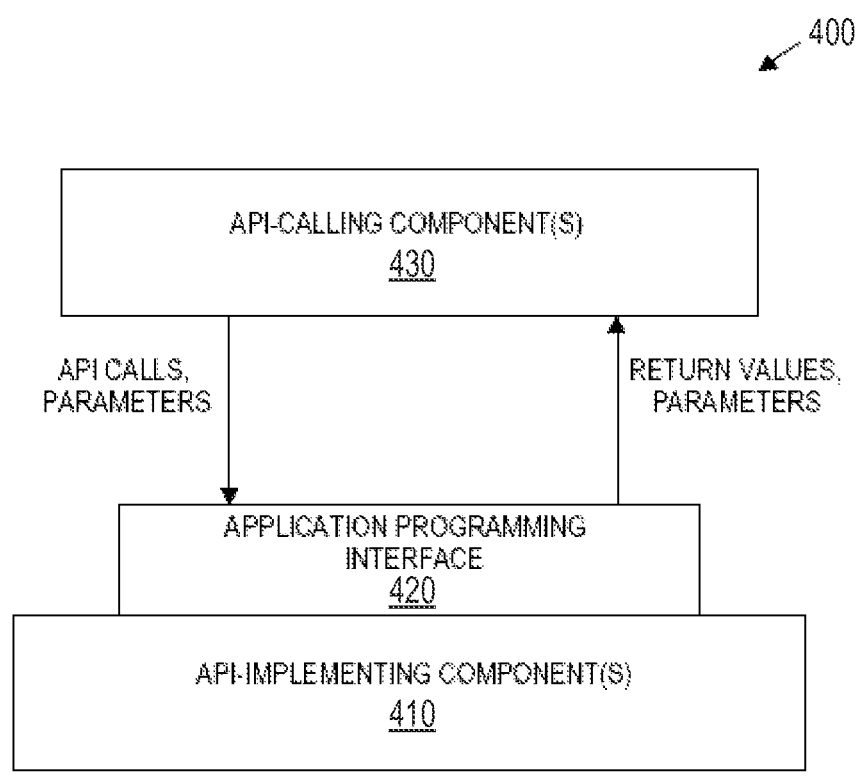
FIG. 4 is a block diagram illustrating an example API architecture.

FIG. 4 is a block diagram illustrating an exemplary API architecture, which may be used in some embodiments of the invention. As shown in FIG. 4, the API architecture 400 includes the API-implementing component 410 (e.g., an operating system, a library, a device driver, an API, an application program, software or other module) that implements the API 420. The API 420 specifies one or more functions, methods, classes, objects, protocols, data structures, formats and/or other features of the API-implementing component that may be used by the API-calling component 430. The API 420 can specify at least one calling convention that specifies how a function in the API-implementing component receives parameters from the API-calling component and how the function returns a result to the API-calling component. The API-calling component 430 (e.g., an operating system, a library, a device driver, an API, an application program, software or other module), makes API calls through the API 420 to access and use the features of the API-implementing component 410 that are specified by the API 420. The API-implementing component 410 may return a value through the API 420 to the API-calling component 430 in response to an API call.

It will be appreciated that the API-implementing component 410 may include additional functions, methods, classes, data structures, and/or other features that are not specified through the API 420 and are not available to the API-calling component 430. It should be understood that the API-calling component 430 may be on the same system as the API-implementing component 410 or may be located remotely and accesses the API-implementing component 410 using the API 420 over a network. While FIG. 4 illustrates a single API-calling component 430 interacting with the API 420, it should be understood that other API-calling components, which may be written in different languages (or the same language) than the API-calling component 430, may use the API 420.

The API-implementing component 410, the API 420, and the API-calling component 430 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 5:
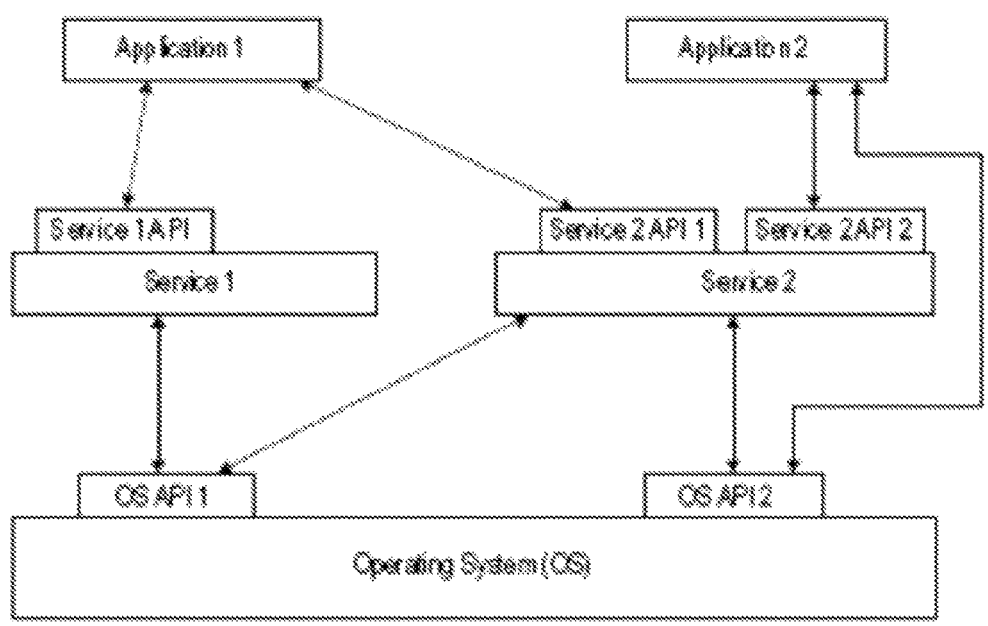
FIG. 5 is a block diagram illustrating an example "Software Stack" that illustrates operation of the example API architecture of FIG. 4.

In FIG. 5 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

In various implementations, a host (such as the system of FIG. 3) may include a touch I/O device (such as the touch I/O device 2012) controlled by a touch I/O device controller (such as the touch I/O device controller 2032). The touch I/O device controller may be configured to operate according to the state diagram illustrated in FIG. 1 and discussed above. In such a case, the host (such as the Operating System 2022) may include one or more APIs that allow one or more applications (such as Applications 2030) to influence the state, sub-state, and/or other operations of the touch I/O device controller.

For example, the host may provide one or more applications access to one or more APIs that the applications may utilize to directly set or change the value of the sub-state variable (such as setting the value of the sub-state variable to a pre-capture value, a capture value, a navigation value, and so on), send one or more commands to the touch I/O device controller commanding one or more changes to the sub-state and/or state of the touch I/O device controller (such as switching to a pre-capture sub-state, a capture sub-state, a navigation sub-state, a hold sub-state, an idle state, a wait for finger on state, and so on), receive one or more interrupts generated by the touch I/O device controller (such as a wait for finger on command interrupt, a finger on command interrupt, a finger off command interrupt, a capture command interrupt, and so on), and so on.

However, in some cases a host may not allow one or more applications to directly control the touch I/O device controller in such a way. In such cases, the host may retain all actual control over the touch I/O device controller but may provide one or more applications access to one or more APIs that enable the applications to request that the host perform one or more such operations. In this way applications may still have access to one or more APIs for performing such functions, but the host may still retain control as to whether or not such operations are actually performed.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A system for semi-autonomous operation of touch I/O device controllers under control of host devices, comprising:
   at least one host device including at least one host processing unit;
   at least one touch I/O device hosted by the at least one host device; and
   at least one touch I/O device controller that controls the at least one touch I/O device; wherein:
   the at least one touch I/O device controller is configured to operate in at least:
   (1) a wait state where the at least one touch I/O device controller waits to detect that the at least one touch I/O device is being touched;
   (2) an idle state where the at least one touch I/O device controller does not wait to detect that the at least one touch I/O device is being touched; and
   (3) an on state where the at least one touch I/O device controller has detected that the at least one touch I/O device is being touched;
   the at least one touch I/O device controller configured to operate in at least one of a plurality of sub-states when operating in the on state; and
   the at least one touch I/O device controller is configured to determine which of the plurality of sub-states to operate in when entering the on state; the determination based at least on a value assigned to a sub-state variable by the at least one host processing unit.

2. The system of claim 1, wherein the at least one touch I/O device controller switches at least one of to the wait state, to the on state, or to one of the plurality of sub-states in response to at least one command received from the at least one host processing unit.

3. The system of claim 1, wherein the plurality of sub-states includes at least a capture sub-state where the at least one touch I/O device controller attempts to capture at least one user fingerprint utilizing the at least one touch I/O device and a navigation sub-state where the at least one touch I/O device controller interprets user finger movement received via the at least one touch I/O device as at least one navigation instruction.

4. The system of claim 3, wherein the at least one touch I/O device controller captures the at least one user fingerprint when operating in the capture sub-state and then switches sub-state based at least one the value assigned to the sub-state variable.

5. The system of claim 3, wherein the at least one touch I/O device controller captures the at least one user fingerprint when operating in the capture sub-state and remains in the capture sub-state based at least one the value assigned to the sub-state variable.

6. The system of claim 3, wherein the plurality of sub-states further includes a pre-capture sub-state where the at least one touch I/O device controller obtains data via the at least one touch I/O device, switches to the capture sub-state and utilizes the data for fingerprint capture if the data does not include more than a threshold value of movement, and switches to the navigation sub-state and utilizes the data for navigation if the data does include at least the threshold value of movement.

7. The system of claim 3, wherein the at least one touch I/O controller detects more than a threshold amount of user finger movement via the at least one touch I/O controller while attempting to capture the at least one user fingerprint when operating in the capture sub-state and the at least one touch I/O controller aborts the attempt to capture the at least one user fingerprint.

8. The system of claim 1, wherein the plurality of sub-states further includes a hold sub-state where the at least one touch I/O device controller does not capture user fingerprints utilizing the at least one touch I/O device or interpret user finger movement received via the at least one touch I/O device as at least one navigation instruction.

9. The system of claim 8, wherein the at least one touch I/O device controller performs at least one of reducing power provided to the at least one touch I/O device or ceasing to provide power to the at least one touch I/O device when operating in the hold sub-state.

10. The system of claim 8, wherein the at least one touch I/O device controller switches to another sub-state of the plurality of sub-states when the at least one touch I/O device controller is operating in the hold sub-state and detects motion via the at least one touch I/O device.

11. The system of claim 10, wherein the at least one touch I/O device controller selects the another sub-state of the plurality of sub-states based at least on the value assigned to the sub-state variable.

12. The system of claim 1, wherein the at least one touch I/O device controller generates at least one command interrupt upon exiting at least one of the wait state, the on state, or one of the plurality of sub-states.

13. The system of claim 12, wherein the at least one command interrupt includes at least one notification transmitted by the at least one touch I/O device controller to the at least one host processing unit indicating that the at least one touch I/O device controller is exiting the at least one of the wait state, the on state, or the one of the plurality of sub-states.

14. The system of claim 1, wherein the at least one host processing unit changes the value assigned to the sub-state variable.

15. The system of claim 1, wherein the at least one host device further includes at least one non-transitory storage medium that stores instructions, which when executed by the at least one host processing unit, cause the at least one host processing unit to perform operations to generate at least one application programming interface (API) that allows an API-calling component to perform at least one of:
   setting the value assigned to the sub-state variable,
   changing the value assigned to the sub-state variable,
   receive at least one command interrupt generated by the at least one touch I/O device controller, or
   command the at least one touch I/O device controller to switch at least one of to the wait state, to the on state, or to one of the plurality of sub-states.

16. The system of claim 1, wherein the at least one host device further includes at least one non-transitory storage medium that stores instructions, which when executed by the at least one host processing unit, cause the at least one host processing unit to perform operations to generate at least one application programming interface (API) that allows an API-calling component to request the at least one host processing unit perform at least one of:
   setting the value assigned to the sub-state variable,
   changing the value assigned to the sub-state variable, receive at least one command interrupt generated by the at least one touch I/O device controller, or command the at least one touch I/O device controller to switch at least one of to the wait state, to the on state, or to one of the plurality of sub-states.

17. A machine implemented method for semi-autonomous operation of touch I/O device controllers under control of host devices, the method comprising:
- operating at least one touch I/O device controller of at least one touch I/O device in at least one of:
  - (1) a wait state where the at least one touch I/O device controller waits to detect that the at least one touch I/O device is being touched;
  - (2) an idle state where the at least one touch I/O device controller does not wait to detect that the at least one touch I/O device is being touched; and
  - (3) an on state where the at least one touch I/O device controller has detected that the at least one touch I/O device is being touched;
  - wherein the at least one touch I/O device controller operates in at least one of a plurality of sub-states when operating in the on state; and
- determining which of the plurality of sub-states to operate in, utilizing the at least one touch I/O device controller, when entering the on state based at least on a value assigned to a sub-state variable by at least one processing unit of a device that hosts the at least one touch I/O device.

18. A data processing system for semi-autonomous operation of touch I/O device controllers under control of host devices, comprising:
- at least one processor to execute instructions; and
- at least one non-transitory storage medium communicably coupled to the at least one processor to store instructions, which when executed by the at least one processor, cause the at least one processor to perform operations to generate an application programming interface (API) that allows an API-calling component to perform the following operations:
  - transferring an influence touch I/O device controller call through the API to cause at least one of:
    - a sub-state variable for the touch I/O device controller to be assigned a value;
    - a host device of the touch I/O device controller to be requested to assign the value to the sub-state variable;
    - a command to switch sub-state or state to be transmitted to the touch I/O device controller; or
    - the host device of the touch I/O device controller be requested to transmit the command to switch the sub-state or the state to the touch I/O device controller;
  - wherein:
    - the touch I/O device controller operates in at least one of:
      - (1) a wait state where the touch I/O device controller waits to detect that at least one touch I/O device controlled by the touch I/O device controller is being touched; and
      - (2) an on state where the at least one touch I/O device controller has detected that the at least one touch I/O device is being touched;
    - the at least one touch I/O device controller operates in at least one of a plurality of sub-states when operating in the on state, the plurality of sub-states including at least a capture sub-state where the at least one touch I/O device controller attempts to capture at least one user fingerprint utilizing the at least one touch I/O device and a navigation sub-state where the at least one touch I/O device controller interprets user finger movement received via the at least one touch I/O device as at least one navigation instruction; and
    - the touch I/O device controller determines which of the plurality of sub-states to operate in when entering the on state based at least on a value assigned to a sub-state variable.

19. A machine implemented method for semi-autonomous operation of touch I/O device controllers under control of host devices in an environment which uses an Application Programming Interface (API), the method comprising:
- transferring an influence touch I/O device controller call through the API to cause at least one of:
  - a sub-state variable for the touch I/O device controller to be assigned a value;
  - a host device of the touch I/O device controller to be requested to assign the value to the sub-state variable;
  - a command to switch sub-state or state to be transmitted to the touch I/O device controller; or
  - the host device of the touch I/O device controller be requested to transmit the command to switch the sub-state or the state to the touch I/O device controller;
- wherein:
  - the touch I/O device controller operates in at least one of:
    - (1) a wait state where the touch I/O device controller waits to detect that at least one touch I/O device controlled by the touch I/O device controller is being touched; and
    - (2) an on state where the at least one touch I/O device controller has detected that the at least one touch I/O device is being touched;
  - the at least one touch I/O device controller operates in at least one of a plurality of sub-states when operating in the on state;
  - the touch I/O device controller determines which of the plurality of sub-states to operate in when entering the on state based at least on a value assigned to a sub-state variable; and
  - the at least one touch I/O device controller generates at least one command interrupt upon exiting at least one of the wait state, the on state, or one of the plurality of sub-states.

20. A system for semi-autonomous operation of touch I/O device controllers under control of host devices, comprising:
- at least one host device including at least one host processing unit;
- at least one touch I/O device hosted by the at least one host device; and
- at least one touch I/O device controller that controls the at least one touch I/O device; wherein:
  - the at least one touch I/O device controller is configured to operate in at least:
    - (1) a wait state where the at least one touch I/O device controller waits to detect that the at least one touch I/O device is being touched; and
    - (2) an on state where the at least one touch I/O device controller has detected that the at least one touch I/O device is being touched;
  - the at least one touch I/O device controller configured to operate in at least one of a plurality of sub-states when operating in the on state;
  - the at least one touch I/O device controller is configured to determine which of the plurality of sub-states to operate in when entering the on state, the determination based at least on a value assigned to a sub-state variable by the at least one host processing unit; and the at least one touch I/O device controller generates at least one command interrupt upon exiting at least one of the wait state, the on state, or one of the plurality of sub-states.

* * * * *